United States Patent
Wiley

(10) Patent No.: US 10,354,773 B2
(45) Date of Patent: Jul. 16, 2019

(54) NOBLE METAL-COATED NANOSTRUCTURES AND RELATED METHODS

(71) Applicant: Duke University, Durham, NC (US)

(72) Inventor: Benjamin Wiley, Durham, NC (US)

(73) Assignee: Duke University, Durham, NC (US)

(*) Notice: Subject to any disclaimer, the term of this patent is extended or adjusted under 35 U.S.C. 154(b) by 0 days.

(21) Appl. No.: 15/482,792

(22) Filed: Apr. 9, 2017

(65) Prior Publication Data
US 2017/0294248 A1    Oct. 12, 2017

Related U.S. Application Data

(60) Provisional application No. 62/319,865, filed on Apr. 8, 2016.

(51) Int. Cl.
| | |
|---|---|
| *B82Y 40/00* | (2011.01) |
| *H01B 1/02* | (2006.01) |
| *B32B 15/01* | (2006.01) |
| *B32B 15/20* | (2006.01) |

(52) U.S. Cl.
CPC .......... *H01B 1/026* (2013.01); *B32B 15/018* (2013.01); *B32B 15/20* (2013.01); *B32B 2255/06* (2013.01); *B32B 2307/202* (2013.01); *B32B 2311/08* (2013.01); *B32B 2311/12* (2013.01); *B32B 2457/206* (2013.01); *B82Y 40/00* (2013.01)

(58) Field of Classification Search
CPC ... B32B 15/018; B32B 15/20; B32B 2255/06; B32B 2307/202; B32B 2311/08; B32B 2311/12

USPC .......................................................... 427/216
See application file for complete search history.

(56) References Cited

U.S. PATENT DOCUMENTS

| | | | |
|---|---|---|---|
| 6,858,318 | B2 | 2/2005 | Kogiso et al. |
| 2004/0221685 | A1 | 11/2004 | Jeong et al. |
| 2005/0056118 | A1 | 3/2005 | Xia et al. |
| 2005/0215689 | A1 | 9/2005 | Garbar et al. |

(Continued)

FOREIGN PATENT DOCUMENTS

| | | |
|---|---|---|
| CN | 1843671 A | 10/2006 |
| CN | 101292362 A | 10/2008 |

(Continued)

OTHER PUBLICATIONS

Wiley-VCH, "Advanced Materials", Expanded Graphite ◇ vol. 21 • No. 43 • Nov. 20, 2009, D10488.

(Continued)

*Primary Examiner* — Alexander M Weddle
(74) *Attorney, Agent, or Firm* — Olive Law Group, PLLC

(57) ABSTRACT

Noble metal-coated nanostructures and related methods are disclosed. According to an aspect, a nanostructure may include a structure comprising a base metal. As an example, the structure may be a nanowire. In a more specific example, the structure may be a copper nanowire or a nanowire made of a base metal such as nickel, tin, indium, zinc, the like, or combinations thereof. The base metal structure may be coated with a noble metal that conformally covers the base metal structure. Example noble metals include, but are not limited to, ruthenium, rhodium, palladium, silver, iridium, platinum, and gold. The coating may be made of one or more of the noble metals along with other materials.

4 Claims, 11 Drawing Sheets

(56) References Cited

U.S. PATENT DOCUMENTS

| | | | |
|---|---|---|---|
| 2008/0072706 | A1 | 3/2008 | Lee et al. |
| 2008/0143906 | A1 | 6/2008 | Allemand et al. |
| 2008/0213609 | A1 | 9/2008 | Jablonski et al. |
| 2008/0283799 | A1 | 11/2008 | Alden et al. |
| 2009/0000364 | A1* | 1/2009 | Yu .................... C25D 17/00 73/105 |
| 2011/0088770 | A1 | 4/2011 | Allemand et al. |
| 2011/0285019 | A1 | 11/2011 | Alden et al. |
| 2013/0008690 | A1 | 1/2013 | Wiley et al. |
| 2014/0342177 | A1 | 11/2014 | Wiley |
| 2016/0293288 | A1* | 10/2016 | Hu .................... C23C 18/1635 |
| 2017/0140846 | A1* | 5/2017 | Park .................... B22F 9/18 |

FOREIGN PATENT DOCUMENTS

| | | | |
|---|---|---|---|
| CN | 101589473 A | 11/2009 | |
| JP | 2009146576 A | 7/2009 | |
| JP | 2011070820 A | 4/2011 | |
| TW | 200946266 A | 11/2009 | |
| WO | 2009107694 A1 | 9/2009 | |
| WO | 2011071885 A2 | 6/2011 | |
| WO | 2014063769 | 5/2014 | |
| WO | WO-2015194850 A1 * | 12/2015 | ................ B22F 9/18 |

OTHER PUBLICATIONS

Won, Yulim et al., "Annealing-free fabrication of highly oxidation-resistive copper nanowire composite conductors for photovoltaics", Department of Materials Science and Engineering, Yonsei University, Seoul, Republic of Korea, Jan. 5, 2014, pp. 1-9.

Wu, Zhuangchun et al., "Transparent, Conductive Carbon Nanotube Films", Science vol. 305, Aug. 27, 2004, pp. 1273-1276.

Xia, Xiaohu et al., "25th Anniversary Article: Galvanic Replacement: A Simple and Versatile Route to Hollow Nanostructures with Tunable and Well-Controlled Properties", Adv. Mater. 2013, 25, pp. 6313-6333.

Yang, Yin et al., "Galvanic Replacement-Free Deposition of Au on Ag for Core-Shell Nanocubes with Enhanced Chemical Stability and SERS Activity", J. Am. Chem. Soc. 2014, 136, pp. 8153-8156.

Ye, Shengrong et al.,"Metal Nanowire Networks: The Next Generation of Transparent Conductors", Adv. Mater. 2014, pp. 1-18.

Zhang, Dieqing et al., "Synthesis of Ultralong Copper Nanowires for High-Performance Transparent Electrodes", J. Am. Chem. Soc. 2012, 134, pp. 14283-14286.

Zhu, Zhaozhao et al., "Transparent conducting electrodes based on thin, ultra-long Copper nanowires and graphene nano-composites", Proc. of SPIE vol. 9177 91770J-1-6.

Advisory Action action dated Oct. 20, 2014 from related U.S. Appl. No. 13/514,176.

Anderson, Bryan D. et al., "Nanoparticle conversion chemistry: Kirkendall effect, galvanic exchange, and anion exchange", Nanoscale, 2014, 6, pp. 12195-12216.

Bae, Sukang et al., "Roll-to-roll production of 30-inch graphene films for transparent electrodes", Nature Nanotechnology, vol. 5, August 2010, pp. 574-578.

Bergin, Stephen M. et al., "The effect of nanowire length and diameter on the properties of transparent, conducting nanowire films", The Royal Society of Chemistry, 2012.

Brininstool, Mark., "Copper (Data in thousand metric tons of copper content unless otherwise noted)" p. 48, <<https://minerals.usgs.gov/minerals/pubs/commodity/copper/mcs-2014-coppe.pdf>>.

Wiley, Benjamin J. et al., "A rapid synthesis of high aspect ratio copper nanowires for high-performance transparent conducting films", Chem. Commun., 2014,50, 2562-2564.

Chen, Zuofeng et al., "Copper Nanowire Networks with Transparent Oxide Shells That Prevent Oxidation without Reducing Transmittance", American Chemical Society, Aug. 1, 2014, pp. A-G.

Cheng, Yin et al., "Copper nanowire based transparent conductive films with high stability and superior stretchability", J. Mater. Chem. C, 2014, 2, 5309-5316.

Elschner, Andreas et al., "Solution-deposited PEDOT for transparent conductive applications", MRS Bulletin • vol. 36 • Oct. 2011, pp. 794-799.

Final Office action dated Apr. 21, 2014 from related U.S. Appl. No. 13/514,176.

Final Office action dated Sep. 4, 2015 from related U.S. Appl. No. 13/514,176.

Gordon, Roy G., "Criteria for Choosing Transparent Conductors", MRS Bulletin/Aug. 2000 pp. 52-57.

Guo, Huizhang et al., "Copper Nanowires as Fully Transparent Conductive Electrodes", Scientific Reports, vol. 3 : 2323, pp. 1-8, Jul. 31, 2013.

Hecht, David S. et al., "Emerging Transparent Electrodes Based on Thin Films of Carbon Nanotubes, Graphene, and Metallic Nanostructures" Adv. Mater 2011, 23, 1482-1513.

Hecht, David S. et al., "High conductivity transparent carbon nanotube films deposited from superacid" Nanotechnology 22 (2011).

Hsu, Po-Chun et al., "Passivation Coating on Electrospun Copper Nanofibers for Stable Transparent Electrodes", American Chemical Society, 2012, vol. 6 No. 6, pp. 5150-5156.

Hu, Liangbing et al., "Scalable Coating and Properties of Transparent, Flexible, Silver Nanowire Electrodes", American Chemical Society, 2010, vol. 4 No. 5, pp. 2955-2963.

Hu, Xiaotian et al., "Large-Scale Flexible and Highly Conductive Carbon Transparent Electrodes via Roll-to-Roll Process and Its High Performance Lab-Scale Indium Tin Oxide-Free Polymer Solar Cells", American Chemical Society, 2014, pp. 6293-6302.

Im, Hyeon-Gyun et al., "Flexible Transparent Conducting Hybrid Film Using a Surface-Embedded Copper Nanowire Network: A Highly Oxidation-Resistant Copper Nanowire Electrode for Flexible Optoelectronics", American Chemical Society, 2014, vol. 8 No. 10, pp. 10973-10979.

Imazu, Naoki et al., "Fabrication of flexible transparent conductive films from long double-walled carbon nanotubes", Sci. Technol. Adv. Mater. 15 (2014) 025005, pp. 1-7.

Indum, U.S. Geological Survey, Mineral Commodity Summaries, Feb. 2014, p. 75.

Katrivanos, Florence C., Silver (Data in metric tons of silver content unless otherwise noted) p. 146, (2014).

Khanarian, G., et al., "The optical and electrical properties of silver nanowire mesh films", Journal of Applied Physics 114,024302 (2013).

Kholmanov, Iskandar N. et al., "Reduced Graphene Oxide/Copper Nanowire Hybrid Films as High-Performance Transparent Electrodes", American Chemical Societ, 2013, vol. 7, No. 2, pp. 1811-1816.

Kim, Taegeon et al., "Highly Transparent Au-Coated Ag Nanowire Transparent Electrode with Reduction in Haze", American Chemical Society, 2014, ACS Appl. Mater. Interfaces 2014, 6, pp. 13527-13534.

Kim, Yeji et al., "Industrially Feasible Approach to Transparent, Flexible, and Conductive Carbon Nanotube Films: Cellulose-Assisted Film Deposition Followed by Solution and Photonic Processing", Applied Physics Express 6 (2013) 025101-4.

Kirchmeyer, Stephan et al., "Scientific importance, properties and growing applications of poly(3,4-ethylenedioxythiophene)", J. Mater Chem., 2005, 15, pp. 2077-2088.

Leterrier, Y. et al., "Mechanical integrity of transparent conductive oxide films for flexible polymer-based displays", Thin Solid Films 460 (2004) pp. 156-166.

Li, Kan et al., "Full-Solution Processed Flexible Organic Solar Cells Using Low-Cost Printable Copper Electrodes", Adv. Mater. 2014, 26, 7271-7278.

Lim, Jong-Wook et al., "Mechanical integrity of flexible Ag nanowire network electrodes coated on colorless Pl substrates for flexible organic solar cells", Solar Energy Materials & Solar Cells 105(2012) pp. 69-76.

Luo, Xiaoxionget al., "Silver-Coated Copper Nanowires with Improved Anti-Oxidation Property as Conductive Fillers in Low-Density Polyethylene", The Canadian Journal of Chemical Engineering, vol. 97, Apr. 2013.

(56) References Cited

OTHER PUBLICATIONS

Mayousse, Céline et al., "Synthesis and purification of long copper nanowires. Application to high performance flexible transparent electrodes with and without PEDOT:PSS", Nano Res. 2014, 7(3): 315-324.
Mirri, Francesca et al., "High-Performance Carbon Nanotube Transparent Conductive Films by Scalable Dip Coating", American Chemical Society, 2012, vol. 6 No. 11, pp. 9737-9744.
Mutiso, Rose M. et al., "Integrating Simulations and Experiments to Predict Sheet Resistance and Optical Transmittance in Nanowire Films for Transparent Conductors", American Chemical Society, Apr. 29, 2013, pp. A-J.
Non-Final Office action dated Dec. 3, 2013 from related U.S. Appl. No. 13/514,176.
Non-Final Office action dated Feb. 27, 2015 from related U.S. Appl. No. 13/514,176.
Rathmell, Aaron R. et al., "Synthesis of Oxidation-Resistant Cupronickel Nanowires for Transparent Conducting Nanowire Networks", American Chemical Society, Mar. 26, 2012, pp. A-G.
Rathmell, Aaron R. et al., "The Growth Mechanism of Copper Nanowires and Their Properties in Flexible, Transparent Conducting Films", Adv. Mater. 2010, XX, pp. 1-6.
Rathmell, Aaron R. et al., "The Synthesis and Coating of Long, Thin Copper Nanowires to Make Flexible, Transparent Conducting Films on Plastic Substrates" Adv. Mater. 2011, 23, 4798-4803.
Response as filed on Apr. 3, 2014 to Non-Final Office action dated Dec. 3, 2013 from related U.S. Appl. No. 13/514,176.
Response as filed on Jul. 27, 2015 to Non-Final Office action dated Feb. 27, 2015 from related U.S. Appl. No. 13/514,176.
Response as filed on Sep. 15, 2014 to Final Office action dated Apr. 21, 2014 from related U.S. Appl. No. 13/514,176.
Response as filed on Sep. 26, 2013 to Restriction Requirement dated Aug. 29, 2013 from related U.S. Appl. No. 13/514,176.
Restriction Requirement dated Aug. 29, 2013 from related U.S. Appl. No. 13/514,176.
Sachse, Christoph et al., "ITO-Free, Small-Molecule Organic Solar Cells on Spray-Coated Copper-Nanowire-Based Transparent Electrodes", Adv. Energy Mater. 2014, 4, 1300737.
Song, Myungkwan et al., "Highly Efficient and Bendable Organic Solar Cells with Solution-Processed Silver Nanowire Electrodes", Adv. Funct. Mater. 2013, 23, 4177-4184.
Sorel, Sophie et al., "The dependence of the optoelectrical properties of silver nanowire networks on nanowire length and diameter", Nanotechnology 23 (2012) 185201 (9pp).
Stewart, Ian E. et al., "Solution-processed copper-nickel nanowire anodes for organic solar cells", The Royal Society of Chemistry, 2014.
Wiley, Benjamin et al., "Polyol Synthesis of Silver Nanostructures: Control of Product Morphology with Fe(II) or Fe(III) Species", American Chemical Society, 2005, vol. 21 No. 18, pp. 8077-8080.

* cited by examiner

NOBLE METAL-COATED NANOSTRUCTURES AND RELATED METHODS

CROSS REFERENCE TO RELATED APPLICATION

This application claims the benefit of and priority to U.S. Provisional Patent Application No. 62/319,865, filed Apr. 8, 2016 and titled NOBLE METAL-COATED COPPER NANOWIRES AND METHODS OF MAKING SAME, the disclosure of which is incorporated herein by reference in its entirety.

TECHNICAL FIELD

The presently disclosed subject matter relates to nanotechnology. Particularly, the presently disclosed subject matter relates to noble metal-coated nanostructures and related methods.

BACKGROUND

Transparent conductors are necessary components for smartphones, organic photovoltaics (OPVs), organic light emitting diodes (OLEDs), flat panel displays, and touch sensors. Indium tin oxide (ITO) is the chief material utilized for this purpose due its low sheet resistance (Rs=10 Ωsq-1) at high transmittance values (>90% T). However, indium is a scarce (less than 0.05 ppm in the Earth's crust) and expensive (~$600 kg-1) starting material and the brittle ceramic nature limits its use in flexible applications. Additionally the vapor phase sputtering process required to fabricate ITO electrodes involves slow linear coating rates that decrease for thicker films resulting in higher final costs. Since solution-phase coating processes do not have to sacrifice speed for thickness and offer coating speeds more than 100 times faster than sputtering methods, an ITO alternative that can be coated from solution without compromising optoelectronic performance can be beneficial to the industry.

Several contenders have emerged as promising candidates to supplant ITO such as poly(3,4-ethylenedioxythiophene):poly(styrenesulfonate) (PEDOT:PSS), carbon nanotubes (CNTs), and graphene, but only metal nanowires are both solution-coatable and demonstrate comparable performance to ITO. Silver nanowires (Ag NWs) have become a frontrunner as they are immediately conductive after coating and the resulting films have high thermal and oxidation stability thus making them attractive as the transparent conducting layer in devices such as OPVs or OLEDs. But silver is even more expensive than indium (~$750 kg-1) with a similar abundance. Copper on the other hand is only 6% less conductive than silver ($\rho Cu=1.68\times10$-8 Ωm, $\rho Ag=1.59\times$10-8 Ωm) but more than 100 times cheaper and 1000 times more abundant. Thus, much attention has been focused on transitioning to more cost-effective copper nanowire based transparent conducting films.

Further, hydrogen annealing at high temperature (200° C.) can burn off the organic material, reduce the surface oxides, and sinter the nanowires together to render the films conductive, but this method can be dangerous, unsuitable for large-scale manufacturing, and does not inhibit future copper oxidation. Recently, a low-temperature solution-based approach has proven to produce similar optoelectronic performance for Cu nanowire films as $H_2$ gas annealing by removing the organic material and etching away the native oxides though carboxylic acid treatment, but this method still fails to protect the nanowires from further oxidation thus hindering their long-term use.

In order to hurdle this barrier, there have been numerous efforts to prevent Cu nanowire oxidation without degrading the optoelectronic properties of the film. Various groups have attempted encapsulating Cu nanowires in an overcoat, such as a grapheme composite or aluminum-doped zinc oxide (AZO), or embedding the nanowires in a plastic. However, these methods require $H_2$ gas or are not scalable. Scalable procedures for depositing Ni as a protective shell on the Cu nanowires were explored, but these methods decreased the transmittance of the nanowire films and thus the overall performance of the networks. To overcome this, Zn, Sn, and In have been electrodeposited on films of copper nanowires and subsequently oxidized to form transparent metal oxide shells that protected the Cu nanowires from oxidation without affecting the electrode performance. However, this technique is also not scalable and the deposited material has to be chemically altered through an additional step in order to regain transparency.

While Cu nanowires are a seemingly enticing solution to many of the problems facing ITO, there are still factors limiting their widespread use. Accordingly, there is a need for improved techniques for producing copper nanowires and other types of nanostructures.

BRIEF SUMMARY

Disclosed herein are noble metal-coated nanostructures and related methods. According to an aspect, a nanostructure may include a structure comprising a base metal. As an example, the structure may be a nanowire. In a more specific example, the structure may be a copper nanowire or a nanowire made of a base metal such as nickel, tin, indium, zinc, the like, or combinations thereof. The base metal structure may be coated with a noble metal that conformally covers the base metal structure. Example noble metals include, but are not limited to, ruthenium, rhodium, palladium, silver, iridium, platinum, and gold. The coating may be made of one or more of the noble metals along with other materials.

According to another aspect, a method for producing a nanostructure is disclosed. The method may include providing a nanostructure comprising a base metal. Subsequently, the nanostructure may be exposed to a solution containing an acid and a noble metal salt such that noble metal ions in the solution are chemically reduced onto and conformally cover the nanostructure. In an example, the acid is a protic acid comprising a carboxylic acid of R—COOH where R is an organic group. In another example, the acid is a protic acid comprising an acid with two or more carboxyi group (—COOH).

Another aspect of the present disclosure provides all that is disclosed and illustrated herein.

These and other novel features and advantages of the disclosure will be fully understood from the following detailed description and the accompanying drawings.

BRIEF DESCRIPTION OF THE SEVERAL VIEWS OF THE DRAWINGS

The foregoing aspects and other features of the present subject matter are explained in the following description, taken in connection with the accompanying drawings, wherein.

DETAILED DESCRIPTION

Figure 1:
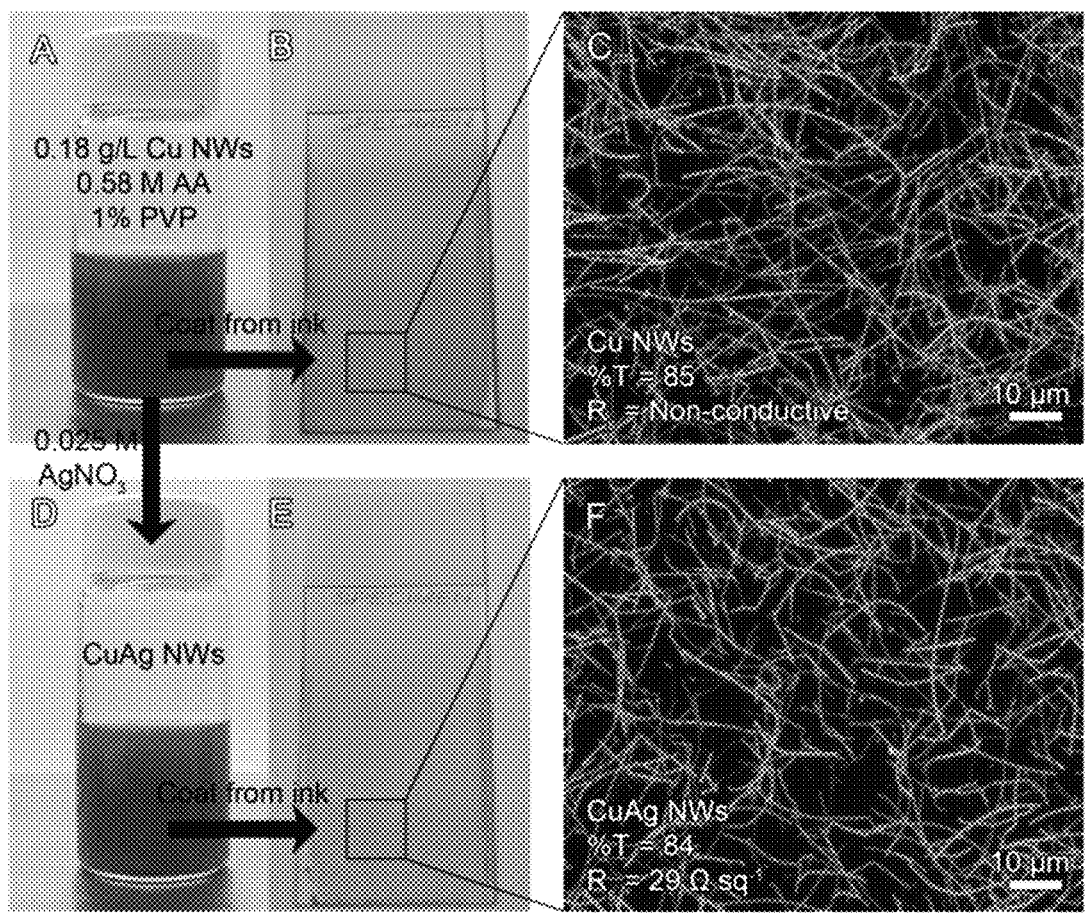
FIG. 1 are images showing an example summary of an example method of fabricating bare copper nanowire networks from solution in accordance with embodiments of the present disclosure.

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Unless otherwise defined, all technical terms used herein have the same meaning as commonly understood by one of ordinary skill in the art to which this disclosure belongs.

Articles "a" and "an" are used herein to refer to one or to more than one (i.e. at least one) of the grammatical object of the article. By way of example, "an element" means at least one element and can include more than one element.

As used herein, the term "nanostructure" refers to a structure having a size on the order of nanoscale. An example nanostructure is a nanowire, which is a nanoscale rod made of semiconducting material. A nanowire may have a diameter on the order of 1-1000 nanometers (10$^{-9}$ meters).

As used herein, the term "noble metal" refers to those metals that are resistant to corrosion and oxidation in moist air. Examples include, but are not limited to, ruthenium, rhodium, palladium, silver, iridium, silver, platinum, and gold. In some embodiments, the metal comprises silver (Ag).

As defined herein, the terms "shell" and "coating" are used interchangeably and correspond to a layer that comprises a noble metal that substantially surrounds the copper nanowires. As used herein, the shell or coating comprises a noble metal selected from the group consisting of ruthenium, rhodium, palladium, silver, iridium, silver, platinum, gold and combinations thereof.

As defined herein, the terms "conformal" and "conformally" are used to describe a relationship between a substance and a surface of a structure. Particularly, the terms can mean that the substance substantially or entirely coats the surface of the structure. Also, for example, the terms can mean that the substance uniformly coats the surface of the structure, such as a surface of a nanostructure. For example, as described herein, silver may conformally cover a surface of a copper nanowire.

As defined herein, "substantially dispersed" corresponds to less than about 5 wt % (weight percentage) of the total weighed amount of Cu nanowires are aggregated. In some examples, "substantially dispersed" can be less than about 2 wt %, or less than 1 wt % of the total weighed amount of CuNWs are aggregated. In this context, "aggregated" refers to the formation of clumps of nanowires due to their mutual van der Waals attraction. Such clumps may include as few as two nanowires, and as many as 10$^{12}$ nanowires or more. Formation of clumps is generally not reversible in this context, and thus may be prevented in order to ensure the film consists of a network of individual wires, rather than clumps. Clumps reduce the transmittance of films, and do not improve the conductivity. Such clumps can easily be identified in a film with a dark field optical microscope, or a scanning electron microscope.

As defined herein, "substantially oxidation resistant" corresponds to an increase in the electrical resistance at least ten times lower than copper nanowires under the same conditions.

As used herein, a nanowire "network" corresponds to a film of nanowires and vice versa.

In accordance with embodiments, copper nanowires, copper nanowire films, and other nanostructures are provided which are coated with noble metals, such as silver, gold, platinum, the like, and combinations thereof. Also, disclosed herein are methods of making such nanostructures. In an example, a method can include electrolessly depositing a thin shell of the noble metal on an outer surface of a nanostructure, such as a copper nanowire, to thereby confer oxidation resistance, transparency, and conductivity to the resulting nanostructure. Methods disclosed herein can include deposition of a less active metal onto a more active metal (e.g., such as silver onto copper) while maintaining the conductivity of the copper nanowire. Nanostructures, such as copper nanowires, disclosed herein can have many uses including, but not limited to, as transparent conductor in optoelectronic devices such as touchscreens, flat panels, OPVs, and OLEDs.

In accordance with embodiments, a nanowire, such as a copper nanowire, as disclosed can have a length of about 1 to 500 microns. In other examples, the length may be between about 10 microns and about 50 microns. In other examples, the nanowire may have a diameter between about 10 nm and 300 nm. In other examples, the copper nanowire may have a diameter of about 15 to about 150 nm. In other examples, the copper nanowire may have a diameter of about 10 nm to 300 nm. In other examples, the copper nanowire can have a diameter of about 15 to about 150 nm.

In other embodiments, a noble metal may be, for example, ruthenium, rhodium, palladium, silver, iridium, platinum, gold, or combinations thereof.

Another aspect of the present disclosure provides a conductive film including a network of copper nanowires having a noble metal shell thereon. The copper nanowires can include a substantially copper core with a noble metal shell. The metal can be, but is not limited to, ruthenium, rhodium, palladium, silver, iridium, platinum, gold, and combinations thereof. The conductive film may have a sheet resistant of less than about 1,000 Ω/sq. In some examples, the sheet resistance is less than 100 Ω/sq. In certain embodiments, the sheet resistance is less than 30 Ω/sq. In other examples, the conductive film has a transparency greater than about 60%. In yet other examples, the transparency is greater than about 70%. In other examples, the transparency is greater than about 85%.

In other embodiments, a conductive film as disclosed can include copper nanowires having a length between about 1 and about 500 microns. In other examples, the length can be between about 10 and about 50 microns. In other examples, a diameter of the copper nanowire can be between about 10 nm and about 300 nm. In other examples, the copper nanowire can have a diameter between about 15 and about 150 nm.

In other embodiments, a conductive film as disclosed herein can include one or more supportive material. The supportive material can include, but is not limited to, cellulose materials, glass, glues, polymeric materials, overcoat materials, the like, or combinations thereof. The conductive film may be flexible.

In accordance with embodiments, the present disclosure provides methods of making films of substantially oxidation resistant copper nanowires. Example methods can include electrolessly depositing a noble metal on the copper nanowire to form a shell that substantially covers the copper nanowire. The noble metal can be ruthenium, rhodium, palladium, silver, iridium, platinum, gold, the like, of combinations thereof.

In accordance with embodiments, the present disclosure provides methods of producing noble metal coated copper nanowires that confer oxidation resistance, transparency, and conductivity. An example method may include immersing the copper nanowire in a metal plating solution at a time and temperature suitable to electrolessly coat the nanowires with the metal. The method may also include collecting the metal-coated nanowires. The noble metal can be ruthenium, rhodium, palladium, silver, iridium, platinum, gold, the like, of combinations thereof.

In accordance with embodiments, methods of producing noble metal coated copper nanowires that confer oxidation resistance, transparency, and conductivity are disclosed. A method may include immersing the copper nanowire in a metal plating solution at a time and temperature suitable for electrolessly coating the nanowires with the metal while stirring. The solution can include, but is not limited to, the metal, Alfa Aesar, PVP and DI water. Further, the method may also include adding nitrocellulose based ink. The method may also include depositing the coated nanowire onto a substrate. Further, the method may include rinsing the deposited copper nanowire. In some embodiments, the films of substantially oxidation resistant copper nanowires have a sheet resistance of less than about 1,000 Ω/sq.

In some embodiments, copper nanowires as disclosed can have a length of between about 1 and about 500 microns. In examples, the copper nanowire can have a length between about 10 and about 50 microns. In other examples, the copper nanowire can have a diameter between about 10 nm and about 300 nm. In other examples, the copper nanowire can have a diameter between about 15 and about 150 nm.

In some embodiments, a substrate as disclosed include, but is not limited to, cellulose materials, glass, glues, polymeric materials, and overcoat materials. In some examples, the substrate may be made of glass.

It should be understood that an acid in the context of the presently disclosed subject matter may be a pure acid or mixture comprising one or more acids. Acids may be protic (Bronsted) acids, and chosen from the following weak acids and strong acids. Weak acids used here can be carboxylic acids, R—COOH where R is an organic group and acids with two or more carboxyi group (—COOH) such as dicarboxylic, tricarboxylic, and higher numbers of carboxylic acid groups. Common examples of acids with one carboxyi group are formic acid (HCOOH), acetic acid ($CH_3COOH$), propionic acid ($C_2H_5COOH$), butyric acid ($C_3H7COOH$), lactic acid ($CH_3CH(OH)COOH$), pyruvic acid ($CH_3COCOOH$), etc.; acids with two carboxylic acid groups such as oxalic acid $(COOH)_2$, malonic acid $CH_2(COOH)_2$, adipic acid $HO_2C(CH_2)_4COOH$, etc.; acids with three carboxyi groups such as citric acid $(COOH)CH_2C(OH)(COOH)CH_2(COOH)$, etc.

In accordance with embodiments, the present disclosure relates to copper nanowires and copper nanowire films coated with noble metals. Example noble metals include, but are not limited to, silver, gold, platinum, and combinations thereof. An example method can include electrolessly depositing a thin shell of the noble metal on the outer surface of the copper nanowire to thereby confer oxidation resistance, transparency, and conductivity to the resulting nanowire. The method including depositing a less active metal onto a more active metal (e.g., silver onto copper) with galvanic replacement that corrodes and oxidizes the template metal and thereby allowing for the metal to be coated. The copper nanowires provided herein have many uses including, but not limited to, as transparent conductor in optoelectronic devices such as touchscreens, flat panels, OPVs, and OLEDs.

It is noted that U.S. patent application Ser. No. 13/514,176 filed on Jun. 6, 2012 entitled "Compositions and Methods for Growing Copper Nanowires" discloses copper nanowire structures, copper nanowire dispersion compositions, copper nanowire-containing films, and methods of making the copper nanowires. The disclosure of U.S. patent application Ser. No. 13/514,176 is hereby incorporated by reference herein in its entirety.

In experiments, it has been shown that copper nanowires having noble metal shells are stabilized against oxidation at above ambient temperatures and/or humid conditions. It has also been shown that these copper nanowires have a high transmittance and a low sheet resistance, similar to that of copper nanowires that have not undergone any substantial oxidation.

In accordance with embodiments, the present disclosure provides a copper nanowire having a noble metal shell thereon. The copper nanowire can include a substantially copper core with a noble metal shell. The metal can be made of ruthenium, rhodium, palladium, silver, iridium, platinum, gold, the like, or combinations thereof.

In accordance with embodiments, the present disclosure provides a conductive film including a network of copper nanowires having a noble metal shell thereon. The copper nanowires include a substantially copper core with a noble metal shell. The metal can be made of ruthenium, rhodium, palladium, silver, iridium, platinum, gold, the like, or combinations thereof. It should be appreciated that the copper nanowires and the films of copper nanowires can include those prepared using the methods described herein. Also, the nanowires can be prepared in accordance with the disclosure of U.S. patent application Ser. No. 13/514,176 or alternatively, the copper nanowires or films of copper nanowires can be produced using other methods as will be understood by those of skill in the art. As defined herein, a "film" of nanowires corresponds to a thin covering of nanowires on a surface. The film may consist solely of nanowires, or of nanowires with supportive materials. For example, the copper nanowires in a material (i.e., an ink) may be coated onto a cellulose material, glue, polymeric material, overcoat material or a glass material to form a conductive film. For the film to be conducting, the nanowires can form an interconnecting network within the film. The copper nanowires may be a dry solid or alternatively in a copper nanowire dispersion comprising at least one surfactant and at least one solvent. In general, any deposition method, including those that are used in web coating or roll-to-roll processes, that involves deposition of material from a liquid phase onto a substrate can be applied to making films of nanowires. Examples of such deposition processes include the Meyer rod process, air-brushing, gravure, reverse roll, knife over roll, metering rod, slot die, immersion, curtain, and air knife coating.

In accordance with embodiments, the metal is electrolessly deposited on the copper nanowire. A noble metal-coated copper nanowire is formed following the electroless coating of the noble metal to form the metal shell on the copper nanowires. In other examples, the transparency may be in the visible region of the electromagnetic spectrum greater than about 80%. In other examples, the transparency may be in the visible region of the electromagnetic spectrum greater than about 85%. The sheet resistance of the film of noble metal-coated nanowires is less than about 1000 Ω/sq. In other examples, the sheet resistance may be less than 100 Ω/sq. In other examples, the sheet resistance may be less than 30 Ω/sq. Accordingly, in another aspect, copper nanowires having a noble metal shell are described herein. The coated copper nanowires comprise a substantially copper core with a noble metal shell and have a length of about 1 to 500 microns. In other examples, the length may be about 10 to about 50 microns. In other examples, the diameter of about 10 nm to 300 nm. In other examples, the diameter may be about 15 to about 150 nm. In other embodiments, the noble metal is selected from the group consisting of ruthenium, rhodium, palladium, silver, iridium, platinum, gold, and combinations thereof. In certain embodiments, the noble metal comprises silver, gold, platinum and combinations thereof.

In some embodiments, the conductive film can include one or more supportive materials. The supportive material can include, but is not limited to, cellulose materials, glass, glues, polymeric materials, and overcoat materials. In other embodiments, the conductive film is flexible.

In other embodiments, a method as disclosed herein includes making films of substantially oxidation resistant copper nanowires. For example, the method includes electrolessly depositing a noble metal on the copper nanowire to form a shell that substantially covers the copper nanowire. The noble metal can include, but is not limited to, ruthenium, rhodium, palladium, silver, iridium, platinum, gold, the like, and combinations thereof.

In other embodiments, a method of producing noble metal coated copper nanowires that confer oxidation resistance, transparency, and conductivity is disclosed. The method includes immersing the copper nanowire in a metal plating solution at a time and temperature suitable to electrolessly coat the nanowires with the metal. Further, the method includes collecting the metal-coated nanowires. The noble metal can include, but is not limited to, ruthenium, rhodium, palladium, silver, iridium, platinum, gold, the like, and combinations thereof.

In other embodiments, a method of producing noble metal coated copper nanowires that confer oxidation resistance, transparency, and conductivity is disclosed. The method can include immersing the copper nanowire in a metal plating solution at a time and temperature suitable to electrolessly coat the nanowires with the metal while stirring. The solution can include the metal, PVP and DI water. The method may also include adding nitrocellulose based ink. Further, the method may include depositing the coated nanowire onto a substrate. The method may also include rinsing the deposited copper nanowire.

In some embodiments, the substrate may include, but is not limited to, cellulose materials, glass, glues, polymeric materials, and overcoat materials.

The following examples are offered by way of illustration and not by way of limitation.

EXAMPLES

Materials and Methods
Copper Nanowire Synthesis
Initially, copper nanowires ($L=28\pm10$ μm and $D=79\pm22$ nm) may be suitably synthesized. Subsequently, the nanowires may be stored in an aqueous polyvinylpyrrolidone (PVP, MW=10 K, 1% by weight, Aldrich) and diethylhydroxylamine (DEHA, 3% by weight, Aldrich) solution with a final concentration of 0.83 mg/mL and backfilled with argon gas.

Silver Nanowire Synthesis
Silver nanowires ($L=15\pm3$ μm and $D=63\pm7$ nm) may be synthesized according to a suitable polyol technique and stored in isopropanol (IPA, BDH).

Copper-Silver/Gold/Platinum Nanowire Synthesis
First, a 20 mL scintillation vial was filled with 2 mL of the Cu NW/PVP/DEHA storage solution, 5.5 mL of 1 M ascorbic acid (AA, Alfa Aesar), and 2 mL of 5 wt % PVP in DI water. This solution can be stirred rapidly for 3 minutes. To produce CuAg nanowires with 5 nm, 15 nm, and 30 nm thick shells of Ag, 0.15 mL, 0.5 mL, and 1 mL of 0.025 M $AgNO_3$ (Carolina), respectively, were added in <1 second to the scintillation vial and the contents were left stirring for ~2 minutes. The CuAg NW solution may subsequently be briefly vortexed to remove any aggregation. This procedure was replicated for copper-gold (CuAu) and copper-platinum (CuPt) nanowires using 0.075 mL of 0.025 M $HAuCl_4$ (Aldrich) and 0.947 mL of 0.01 M $K_2PtCl_4$, respectively.

Nanowire Film Fabrication
Prior to preparing the nanowire transparent electrodes, the glass substrates (7.62 cm×2.54 cm microscope slides, VWR) may be sonicated in acetone for ten minutes and transferred to IPA to remove surface contaminants. The slides may be wiped dry with a suitable lab wipe (e.g., a KIMWIPE lay wipe available from Kimberly-Clark Worldwide, Inc.) and blown under air immediately prior to nanowire deposition.

Copper Nanowire Film Fabrication
The copper nanowires were collected into a 1.5 mL vial from the DEHA/PVP storage solution via centrifugation and supernatant removal. Subsequently, the nanowires may be washed 3 times with 1 mL 3 wt % DEHA, once with 1 mL 190 proof ethanol (Koptec). Also, the nanowires may be washed once with 1 mL of an ink formulation (0.06 g nitrocellulose (Scientific Polymer) dissolved in 2.94 g acetone (EMD) with subsequent addition of 3 g ethanol (Koptec), 0.5 g ethyl acetate (Aldrich), 1 g pentyl acetate (Aldrich), 1 g IPA, and 1.7 g toluene (Aldrich)). The suspensions were vortexed between each wash.

Following removal of the ink wash supernatant, a small amount of the ink may be added to the nanowires. This suspension can be vortexed to disperse the nanowires in the ink. 30 µL may be pipetted in a line across the top of the glass slide. A Meyer rod (Gardco #13) can be quickly (<1 second) drawn down the slide by hand to evenly spread the nanowire coating. The amount of ink added to the nanowires may be increased to decrease the copper nanowire concentration.

It is noted that the copper nanowire films may not be immediately conductive after coating. To remove the remaining nitrocellulose and sinter the nanowires together, the copper nanowire films may be plasma cleaned in a forming gas (95% $N_2$, 5% $H_2$) atmosphere then placed in a tube furnace at 200° C. for 30 minutes under a constant flow of $H_2$ (600 mL $min^{-1}$).

Silver Nanowire Film Fabrication

The silver nanowires may initially be decanted from the IPA storage solution after centrifugation. The nanowire may be washed with 1 mL of the nitrocellulose ink formulation and coated via Meyer rod from this ink. It is noted that the silver nanowires may be conductive after plasma cleaning under forming gas for 1 minute or washing with acetone for 30 seconds (repeated twice) and DI water for 60 seconds.

Copper-Silver/Gold/Platinum Nanowire Film Fabrication

The CuAg, CuAu, and CuPt nanowires may be collected by centrifuging the reaction solution at 2000 rpm until the nanowires settled and the supernatant could be removed. The nanowires were then washed twice with 1.5 mL of 190 proof ethanol to remove the AA and PVP and once with 1.5 mL the ink formulation. The solutions may be briefly vortexed (<5 seconds) between washing steps.

Films of CuAg, CuAu, and CuPt nanowires may be conductive immediately after coating. A 30 second acetone rinse (repeated twice) and a 60 second water rinse (with air drying under an air knife between each rinse) may be performed to remove the nitrocellulose and any remaining PVP and decrease the sheet resistance of the films.

Oxidation Resistance Studies

Dry oven sheet resistance ($R_s$) measurements may be periodically taken via 4 point probe. Humidity chamber measurements may be taken by first cutting the nanowire films into 1 cm×2.54 cm pieces and quarantining a 1 cm×1 cm area with silver paste and placing the samples in a Test Equity 200H Series Temperature/Humidity Chamber at 85° C./85% RH. Sheet resistance measurements can be made by wiring connections from the silver paste ends on the samples to a multimeter through the silicon port on the humidity chamber. Each time point is an average of 5 multimeter measurements.

Instrumentation and Characterization

Dark field optical microscopy (DFOM) images may be captured with a suitable microscope, such as a BX51 microscope available from Olympus Corporation. SEM (FEI XL30 SEM-FEG) images may also be suitably captured. TEM-EDS mapping (Energy dispersive X-ray spectroscopy, Super X EDS System) may also be suitably performed. Copper TEM grids with a thin coating of carbon (400 mesh, SPI, #3540C-FA) may be used to support the nanowires. Once deposited on a grid, each sample may be dried completely under a flow of nitrogen. Cyclic Voltammetry (CV) experiments may be performed with suitable workstation (e.g., a model CHI601D electrochemical workstation available from CH Instruments, Inc.) at room temperature. The three electrode system includes a ~0.5×2.5 cm acetic acid treated piece of Cu foil as the working electrode, a platinum wire as the counter electrode, and a Ag/AgCl reference electrode (0.198 V vs NHE). A 0.2 M $Na_2SO_4$ solution may be used as the electrolyte. Potentials were reported vs. Ag/AgCl. Metal concentration measurements were completed using a Perkin Elmer 3100 atomic absorption spectrophotometer (AAS). For all nanowire films, transmittance and absorption data were collected using a UV-Vis-NIR spectrophotometer (Cary 6000i) and sheet resistance values were measured using a four-point probe (Signatone SP4-50045TBS).

Figure 10B:
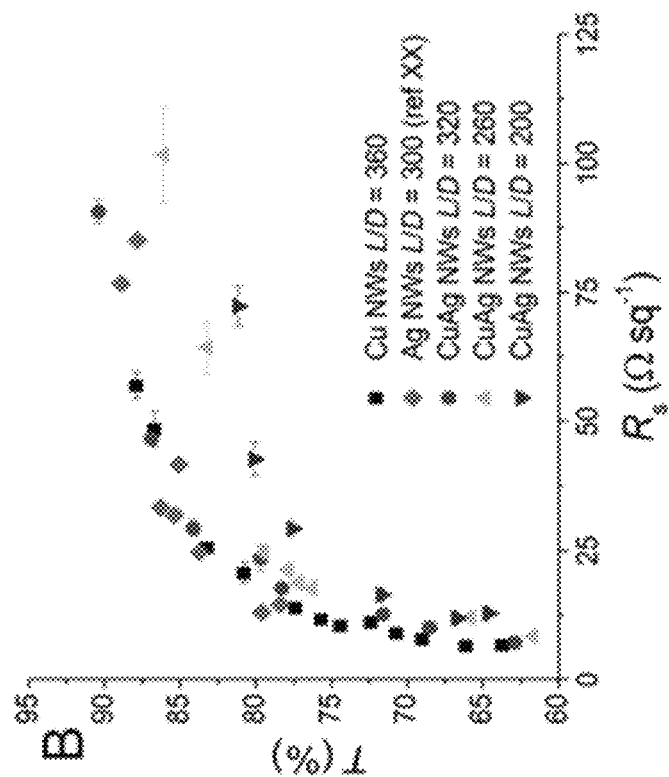
FIG. 10B shows plots of transmittance versus sheet resistance for CuAg nanowires with various aspect ratios.
Figure 10A:
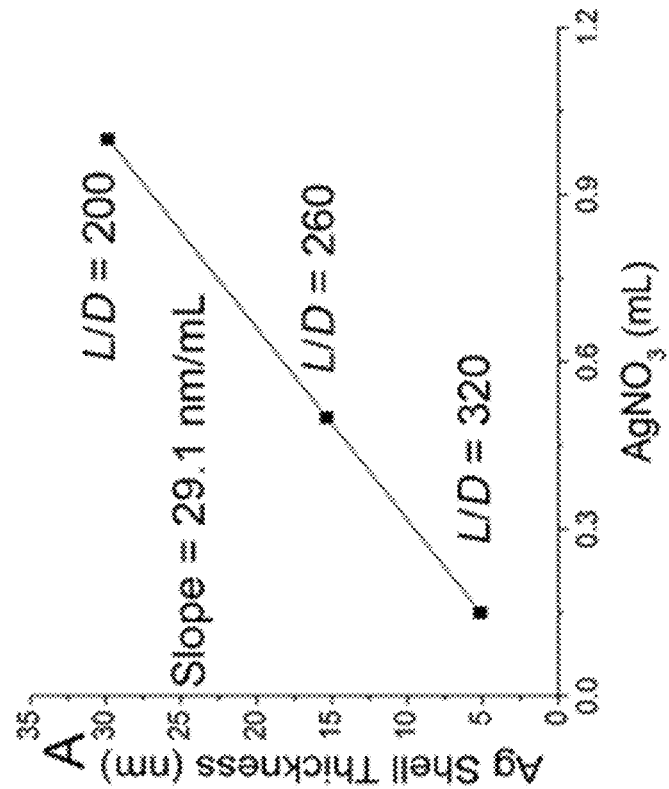
FIG. 10A is a graph of the thickness of the resulting silver layer on the copper nanowires versus volume of AgNO$_3$ added.

FIG. 10A illustrates a plot of Ag thickness on the CuNWs versus the volume of $AgNO_3$ added to the copper nanowire, AA, and PVP/DEHA solution. The resulting aspect ratios are indicated. FIG. 10B illustrate plots of transmittance versus sheet resistance for the CuAg nanowires with 5 nm, 15 nm, and 30 nm thick Ag shells (L/D=320, 260, and 200 respectively). Bare copper nanowires (L=28.3 µm, D=79 nm) and Ag NWs (L=25 m, D=85 nm) of similar aspect ratio are shown for comparison. The data points in FIG. 10B are taken by an average of 5 probe measurements.

Figure 11A:
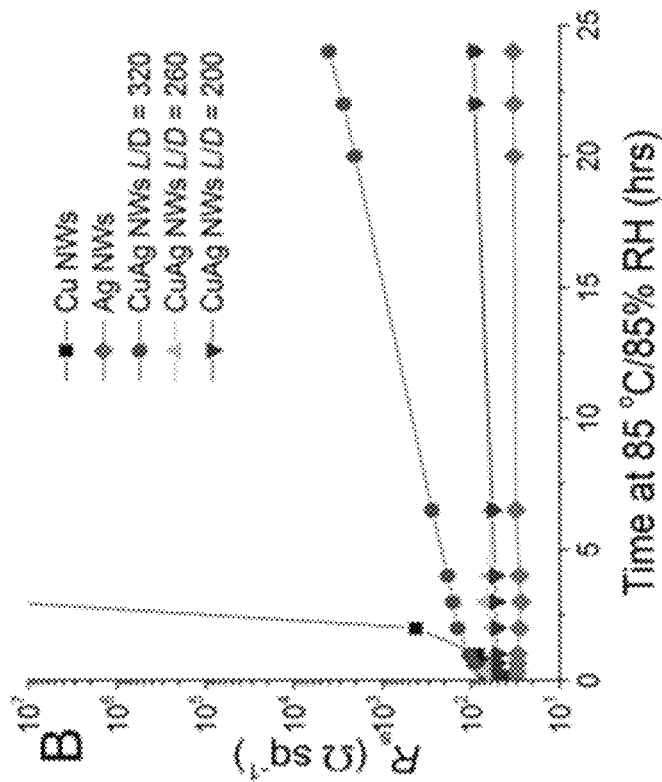
FIG. 11A is a graph showing plots of sheet resistance versus time for copper nanowires, silver nanowires, and varying aspect ratio CuAg nanowires in a dry oven at 160° C.
Figure 11B:
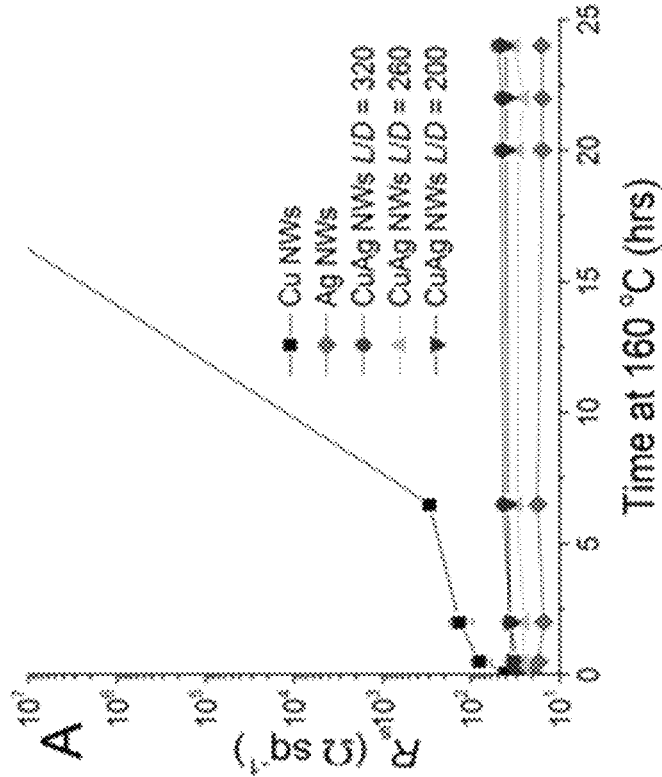
FIG. 11B is a graph showing plots of sheet resistance versus time for copper nanowire, silver nanowires, and varying aspect ratio CuAg nanowires at 85° C./85% RH.

FIG. 11A is a graph showing plots of sheet resistance versus time for copper nanowires, silver nanowires, and varying aspect ratio CuAg nanowires in a dry oven at 160° C. FIG. 11B is a graph showing plots of sheet resistance versus time for copper nanowire, silver nanowires, and varying aspect ratio CuAg nanowires at 85° C./85% RH. The data points in FIG. 11A are taken by an average of 5 probe measurements.

Copper-Silver Nanowires Synthesis, Film Fabrication, and Characterization

In accordance with embodiments, methods are disclosed for fabricating transparent copper nanowire films that are conductive as printed. For example, a thin shell of silver deposited on the copper nanowires using a solution phase, room temperature, reproducible procedure taking less than 10 minutes is disclosed. FIG. 1 are images (labeled A-F) showing an example summary of an example method of fabricating bare copper nanowire networks from solution in accordance with embodiments of the present disclosure. Image A of FIG. 1 shows a vial containing the copper nanowire aqueous DEHA storage solution mixed with AA and PVP. Image B of FIG. 1 shows a film of copper nanowires coated via Meyer rod from ink. Image C of FIG. 1 shows a DFOM image of a copper nanowire network at 85% T after coating and solvent rinsing. Image D of FIG. 1 shows a solution of CuAg nanowires after 0.15 mL of 0.025 M $AgNO_3$ was added to the solution shown in image A of FIG. 1. Image E of FIG. 1 shows a film of the CuAg nanowires coated via Meyer rod from ink. Image F of FIG. 1 shows a DFOM image of a conductive network of CuAg nanowires after an acetone and water rinse.

Referring now to image A of FIG. 1, the copper nanowires are transferred from their storage solution of PVP/DEHA to a nitrocellulose based ink and are deposited onto a glass substrate via a Meyer rod (see image B of FIG. 1) resulting in a randomly dispersed network of nanowires (see image C of FIG. 1). If a small amount of $AgNO_3$ is added to a stirring copper nanowire storage solution with AA and extra PVP (to hinder NW aggregation), the nanowires are coated with silver. After this coating, a color change from copper red to silver grey is seen (see images A-D of FIG. 1). Indeed, increasing the amount of silver produces a more exaggerated change as the color of the nanowires in solution and as films transitions to the color of pure Ag NWs (see images A and B of FIG. 1). The CuAg NWs can then be purified and made into transparent films in the same manner as bare Cu NWs (FIG. 1E) but are conversely immediately conductive.

Figure 2:
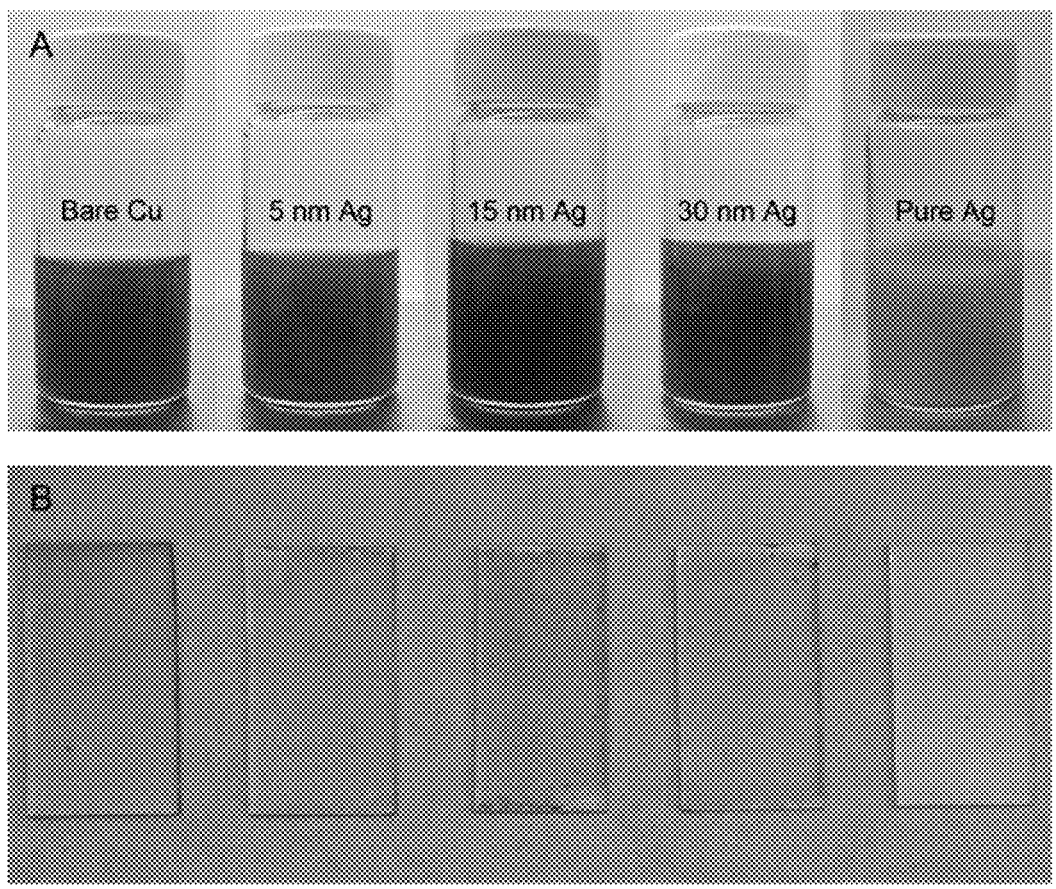
FIG. 2 are images showing a comparison of bare Cu NWs, CuAg NWs with different amounts of silver.

FIG. 2 are images (images A and B) showing a comparison of bare Cu NWs, CuAg NWs with different amounts of silver. Referring to image A of FIG. 2, the image shows, from left to right: solutions of bare Cu NWs, CuAg NWs with 5 nm Ag, CuAg NWs with 15 nm Ag, CuAg NWs with 30 nm Ag, and pure Ag NWs. Image B of FIG. 2 shows, from left to right: films of Cu NWs, Cu Ag NWs with 5 nm Ag, CuAg NWs with 15 nm Ag, CuAg NWs with 30 nm Ag, and pure Ag NWs. The color change of nanowires in solution and deposited on films demonstrates an obvious color change from copper to silver as a thicker layer of silver is deposited on the copper nanowires.

Figure 3A:
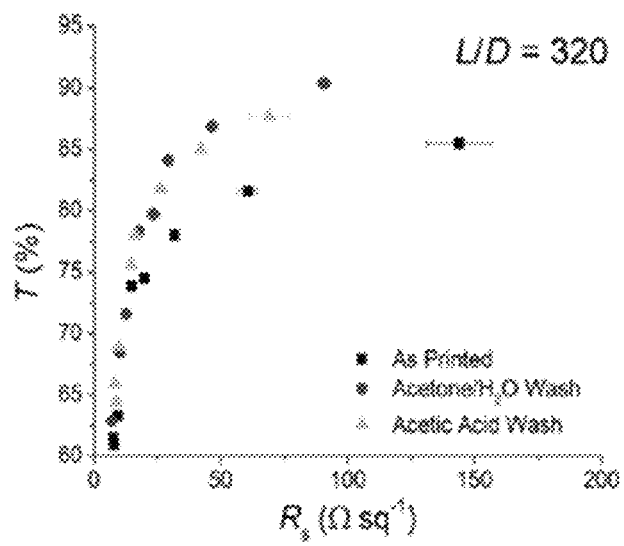
FIGS. 3A-3C are graphs showing the transmittance versus sheet resistance plots for CuAg nanowires.
Figure 3B:
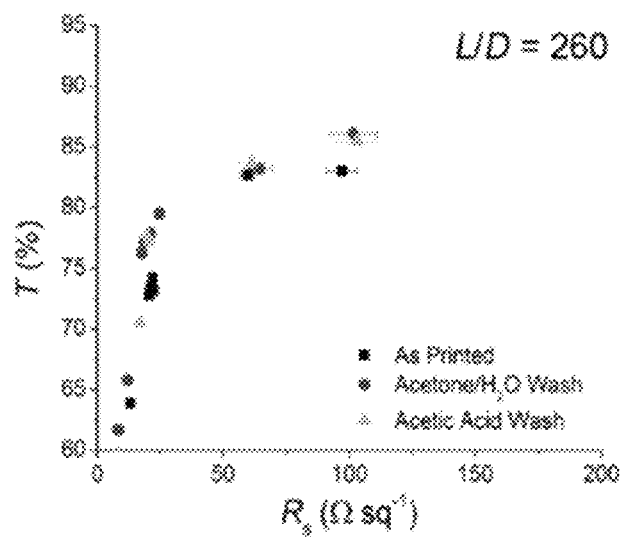
Figure 3C:
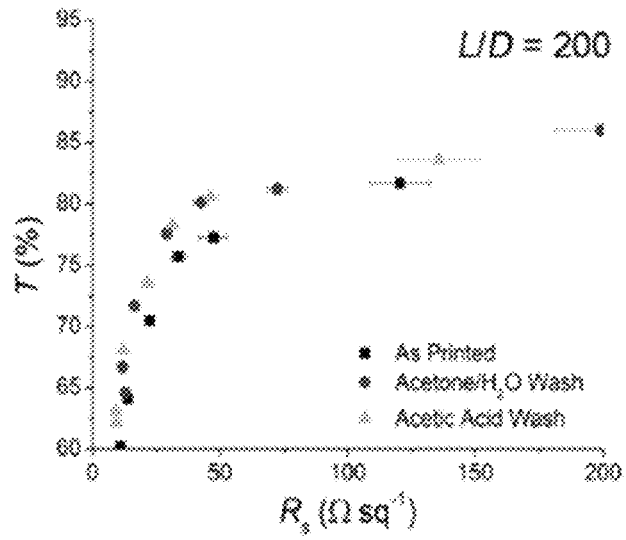

Unlike bare copper nanowires, films of randomly dispersed CuAg nanowires were conductive without the use of high temperature $H_2$ annealing or acid treatment. Images C and F of FIG. 1 are DFOM images of bare copper nanowire and CuAg nanowire networks, respectively, and clearly show that the nanowires form an interconnected network in both cases after coated from ink. The relative color change seen on a macroscopic scale after $AgNO_3$ addition to the reaction solution and during film fabrication is apparent once again microscopically as the light scattered by the nanowires appears slightly more silver in color. As expected, the bare copper nanowire films are insulating immediately after coating due to the presence of native copper oxides and the nitrocellulose left over from the ink. In contrast, CuAg nanowires are conductive as printed and their performance can be further improved with a brief rinse in acetone and water to remove any remaining nitrocellulose and PVP (see FIGS. 3A-3C). FIGS. 3A-3C are graphs showing the transmittance versus sheet resistance plots for CuAg nanowires. Particularly, transmittance versus sheet resistance plots are shown for FIG. 3A is L/D=320 CuAg nanowires, for FIG. 3B is L/D=260 CuAg NWs, and FIG. 3C is L/D=200 CuAg nanowires as printed from ink, after acetone/DI water rinses, and after an acetic acid wash following printing. For example, a CuAg nanowire film treated with acetone and water has a sheet resistance of 29 Ωsq-1 at 84% T, a level of performance that bare copper nanowires can only achieve after being annealed under $H_2$ gas or treated with acid. It is worth noting that bare copper nanowires are still non-conductive after similar acetone/water rinses as the copper oxides present still inhibit conductivity. A more detailed discussion of this phenomenon is described herein. The ease of fabrication and the minimal post processing utilized for films of CuAg nanowires are comparable to pure Ag nanowires where usually a drying step (at ≥120° C.) is required to remove any organics and anneal the nanowires after they have been deposited.

Figure 4A:
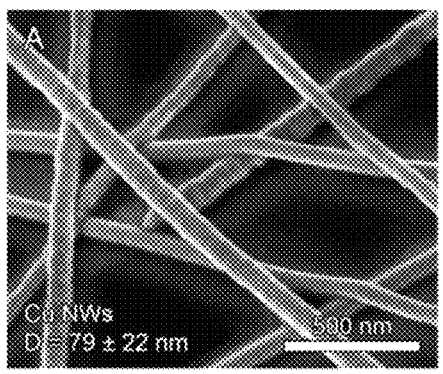
FIGS. 4A-4F show SEM images of bare copper nanowires and copper nanowires after the addition of 0.15 mL 0.025 M AgNO$_3$.
Figure 4B:
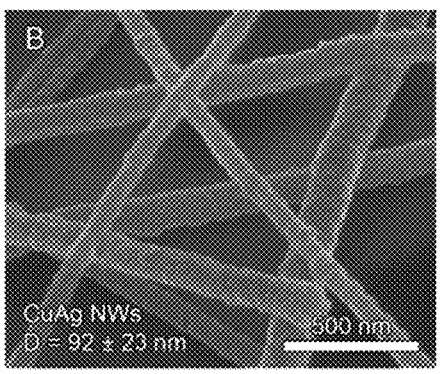
Figure 4C:
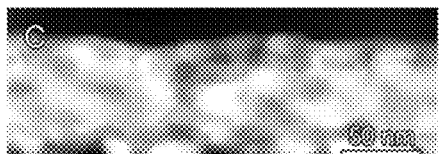
Figure 4E:
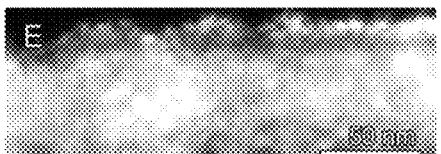
Figure 4D:
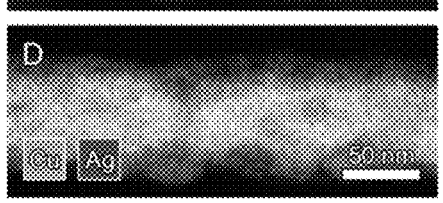
Figure 4F:
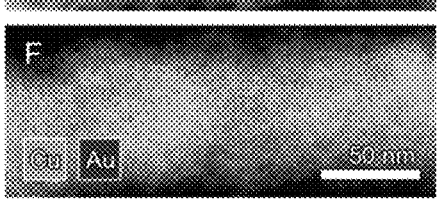

As shown in FIG. 2 show SEM images of copper nanowires before and after silver addition in accordance with embodiments of the present disclosure. More particularly, image A in FIG. 2 shows bare copper nanowires (diameter=79±22 nm). Image B in FIG. 2 shows copper nanowires after the addition of 0.15 mL 0.025 M $AgNO_3$ (diameter=92±23 nm). Average diameters were calculated from 50 distinct nanowires. FIGS. 4C and 4E show TEM images of a CuAg nanowire and a CuAu nanowire, respectively. FIGS. 4D and 4F show EDS images of a CuAg nanowire and CuAu nanowire, respectively.

Figure 5C:
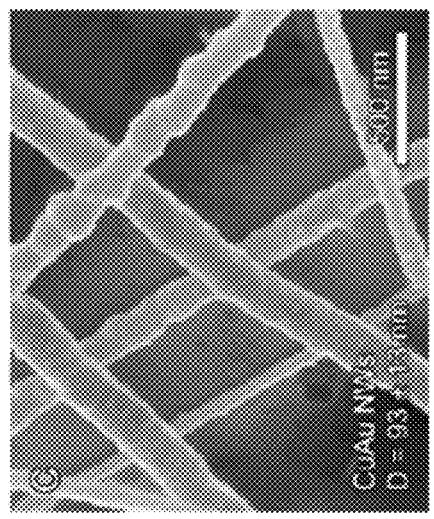
FIGS. 5A-5C are images showing the transition from copper to CuAg nanowires in accordance with embodiments of the present disclosure.
Figure 5B:
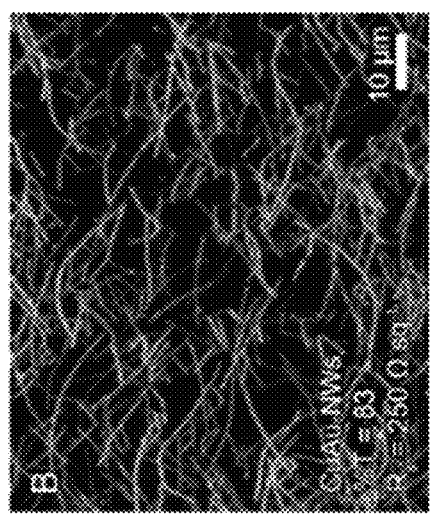
Figure 5A:
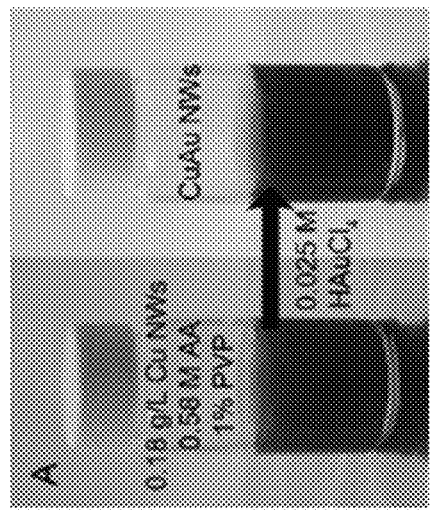
Figure 6B:
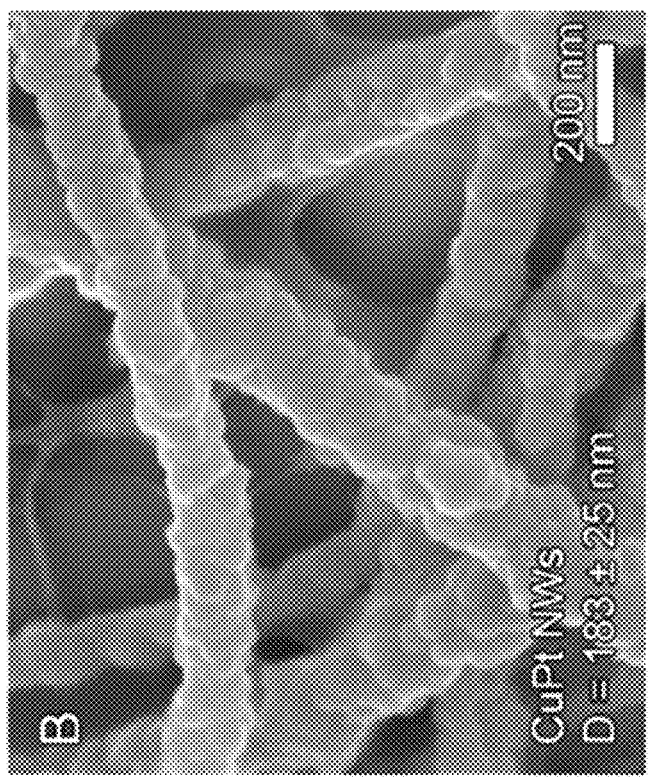
FIGS. 6A and 6B are optical and SEM images, respectively, showing CuPt nanowires.
Figure 6A:
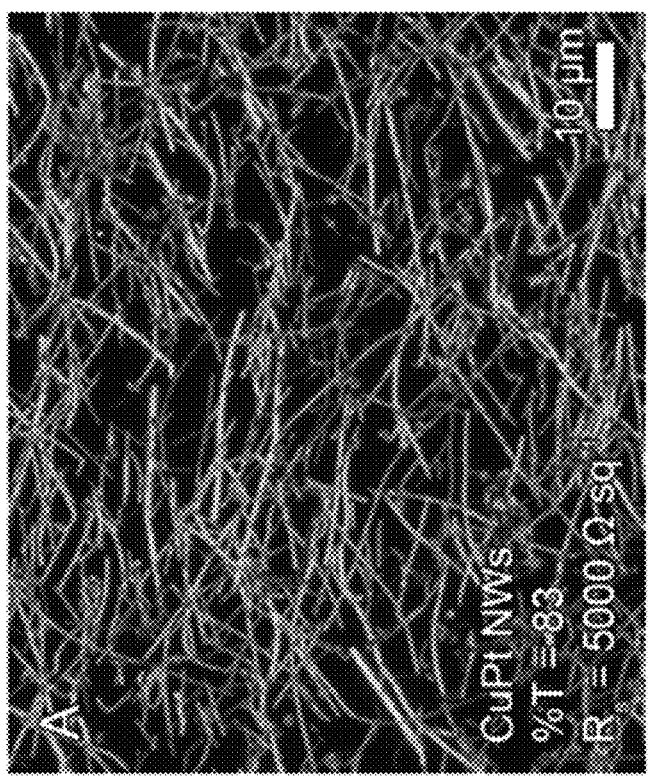

In embodiments, bare copper nanowires had an average diameter of 79±22 nm which increased to 92±23 nm after 0.15 mL of 0.025 M $AgNO_3$ were added. The SEM image of the CuAg nanowires in FIG. 4B shows a continuous, smooth layer of silver coating the copper nanowires. TEM (see FIG. 4C) and EDS mapping (see FIG. 4D) images indicate that the entire copper nanowire is covered with a ~5 nm layer of silver, leading to a copper core and silver shell structure. When this procedure was extended to even more inert metals, gold and platinum, similar results were observed with a thin layer of gold coating the Cu NWs (TEM and TEM-EDS images in FIGS. 4E and 4F). Supporting FIGS. 5A-5C, 6A and 6B provide more extensive evidence of copper nanowire to CuAu and CuPt nanowire transitions via the same procedure mentioned above for CuAg nanowires. FIGS. 5A-5C are images showing the transition from copper to CuAg nanowires. FIG. 5A is an image showing the transition from copper to CuAu nanowires after the addition of 0.075 mL $HAuCl_4$ (0.025 M). FIG. 5B shows DFOM. FIG. 5C shows SEM images showing networks of CuAu nanowires and a diameter increase from 79±22 nm to 93±13 nm. Average diameters were calculated from 50 distinct nanowires. FIGS. 6A and 6B are optical and SEM images, respectively, showing CuPt nanowires. After platinum coating, the diameter of the nanowires increases from 79±22 nm to 183±25 nm. Average diameters were calculated from 50 nanowire distinct nanowires. Camera (see FIG. 5A for gold) and optical (see FIG. 5B for gold and FIG. 6A for platinum) images depict greyscale changes from bare copper nanowires. SEM images (FIG. 5C for gold and FIG. 6B for platinum) show networks of CuAu and CuPt nanowires and a corresponding diameter increase to 93±13 nm and 183±25 nm for CuAu and CuPt nanowires, respectively.

Figure 7C:
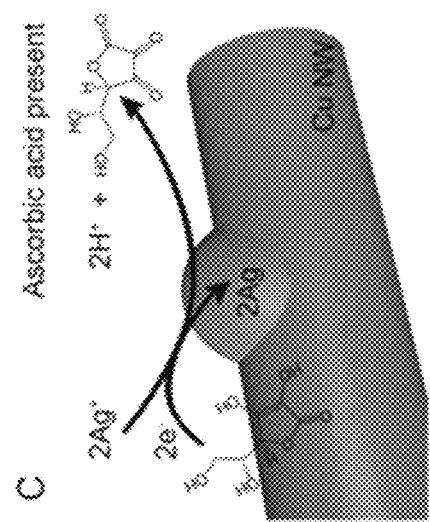
FIGS. 7A-7C shows CVs of a copper foil in various AA concentrations, schematics depicting the galvanic etching of a copper nanowire by Ag$^+$, and the deposition of Ag on a copper nanowire in the presence of AA.
Figure 7B:
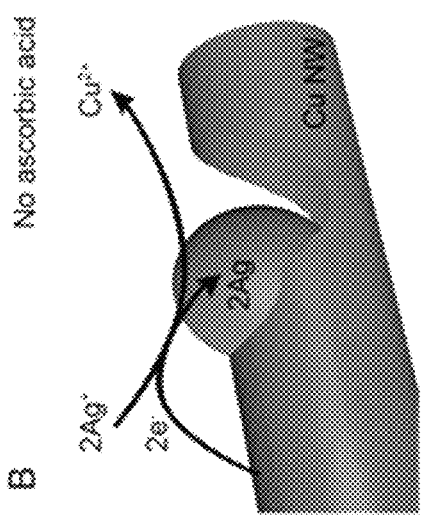
Figure 7A:
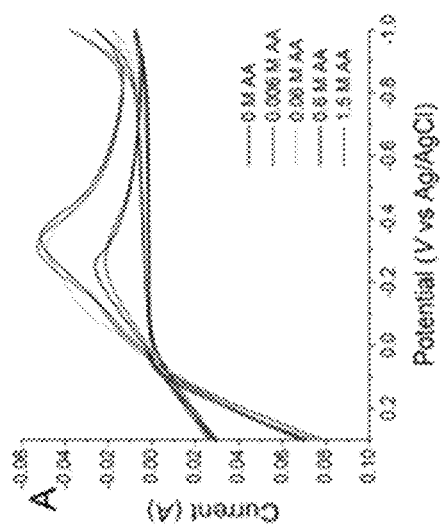

FIG. 7A shows CVs of a copper foil in various AA concentrations in accordance with embodiments of the present disclosure. FIG. 7B shows a schematic depicting the galvanic etching of a copper nanowire by $Ag^+$. FIG. 7C shows a schematic depicting the deposition of silver on a copper nanowire in the presence of AA. FIGS. 7A-7C show CVs of a copper foil in various AA concentrations, galvanic etching of a copper nanowire by $Ag^+$ reduction and deposition of silver on a copper nanowire the presence of AA in accordance with embodiments of the present disclosure. In these embodiments, the galvanic replacement of copper nanowires by silver cations (as well as gold and platinum) appeared to be inhibited by realizing the metal reduction in a highly reducing environment. Galvanic replacement reactions typically occur when a more inert metal cation is introduced to a more active metal due to a higher electrochemical potential of the former. Specifically, $Ag^+$ (E° ($Ag^+/Ag$)=+0.8 V) should be spontaneously reduced by copper (E° ($Cu^{2+}/Cu$)=+0.34 V) following $Cu+2Ag^+ \rightarrow Cu^{2+}+2Ag$, leading to dissolution of the copper metal. At the nanoscale, this galvanic replacement typically results in etching or hollowing of the template material which can be detrimental to the final properties of the product. Here, however, galvanic etching is avoided due to the high AA concentration. To further investigate the role of AA, CV measurements were taken using a copper foil as the working electrode to simulate a copper nanowire network with various concentrations of AA added to the reaction cell. As shown in FIG. 3A, in the absence of AA, scanning the electrode beyond about 0.1 V results in copper surface oxidation to $Cu^{2+}$ (or CuO, $Cu(OH)_2$).

Figure 8:
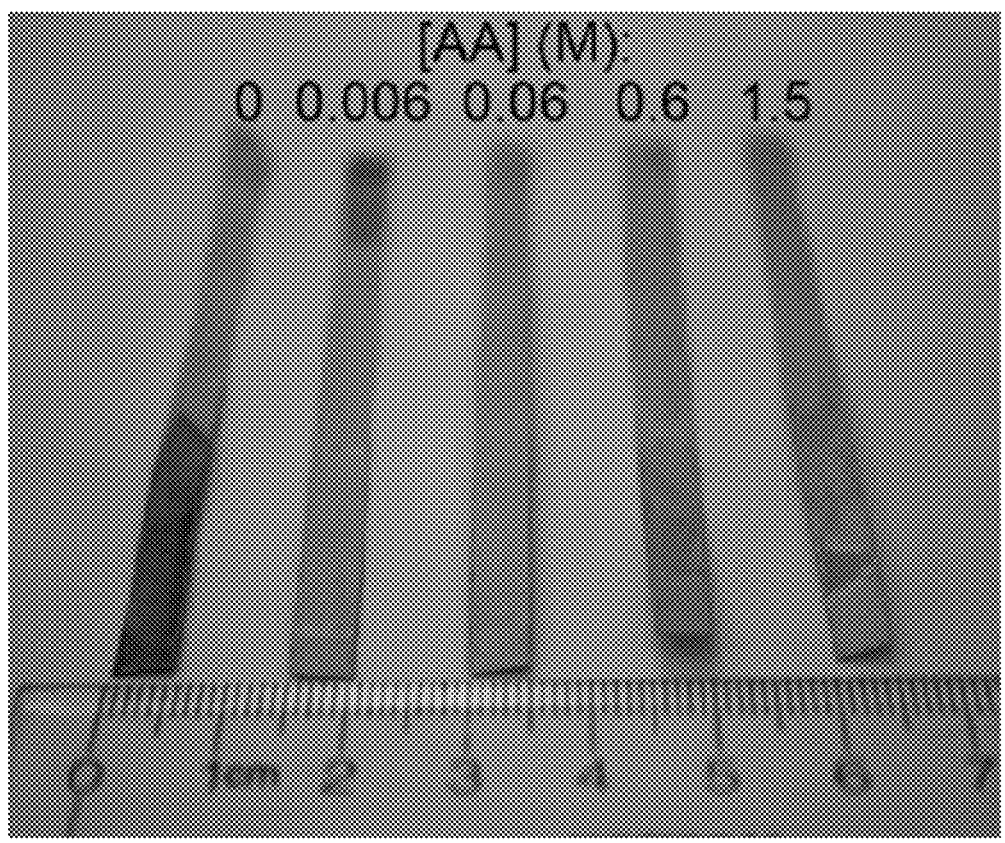
FIG. 8 shows copper foil pieces following CV experiments with and without AA.

In the reverse scan, there is only one wave appearing at ~−0.25 V attributable to the re-reduction of $Cu^{2+}$ to Cu. By addition of relatively dilute AA (0.006 M), the oxidation and re-reduction currents were both slightly decreased indicating that the copper surface oxidation is slightly suppressed. This is apparent in FIG. 8 which shows a camera image of the five Cu foil samples used in the CV experiments. Particularly, FIG. 8 shows copper foil pieces following CV experiments with and without AA. When no AA is present the copper foil is clearly oxidized as indicated by the change in color beginning at the interface of the reaction solution. When AA is present in the solution the copper foil samples remain red after CV scans. CV experiments for each sample were performed at 100 mV/s for 300 s.

The piece of foil immersed in the reaction solution with 0 M AA turns slightly black after CV scans (100 mV/s for 300 s) indicating surface oxidation of the copper. In contrast, in the presence of AA, the copper surface is still reddish in color after CV scans. Furthermore, as the concentration of AA is increased to 0.06 M, the oxidation current was greatly increased and a shoulder peak at a more negative reduction potential of ~-0.35 V becomes prominent due to the redox process of dehydroascorbic acid ($DHA^{2+}$)/AA. Eventually at even higher AA concentrations (0.6 and 1.5 M), the $DHA^{2+}$/AA redox process overtakes the $Cu^{2+}$/Cu redox indicating that concentrated AA is able to protect copper from oxidation. In fact, AA plays an additional role when incorporated into a solution of copper nanowires with $Ag^+$. At a concentration of 0.6 M, AA is able to reduce $Ag^+$ onto the copper nanowire surface. This is due to a thin layer of AA completely surrounding the copper nanowires which donates electrons to reduce $Ag^+$ at the interface between the copper nanowires and solution allowing for an even silver deposition on the copper nanowires and preventing galvanic etching (schematically represented in FIGS. 3B and 3C). Additionally, the more negative reduction potential for AA compared to copper provides a thermodynamic driving force for reduction of $Ag^+$ ions rather than the copper nanowires themselves.

Figure 9:
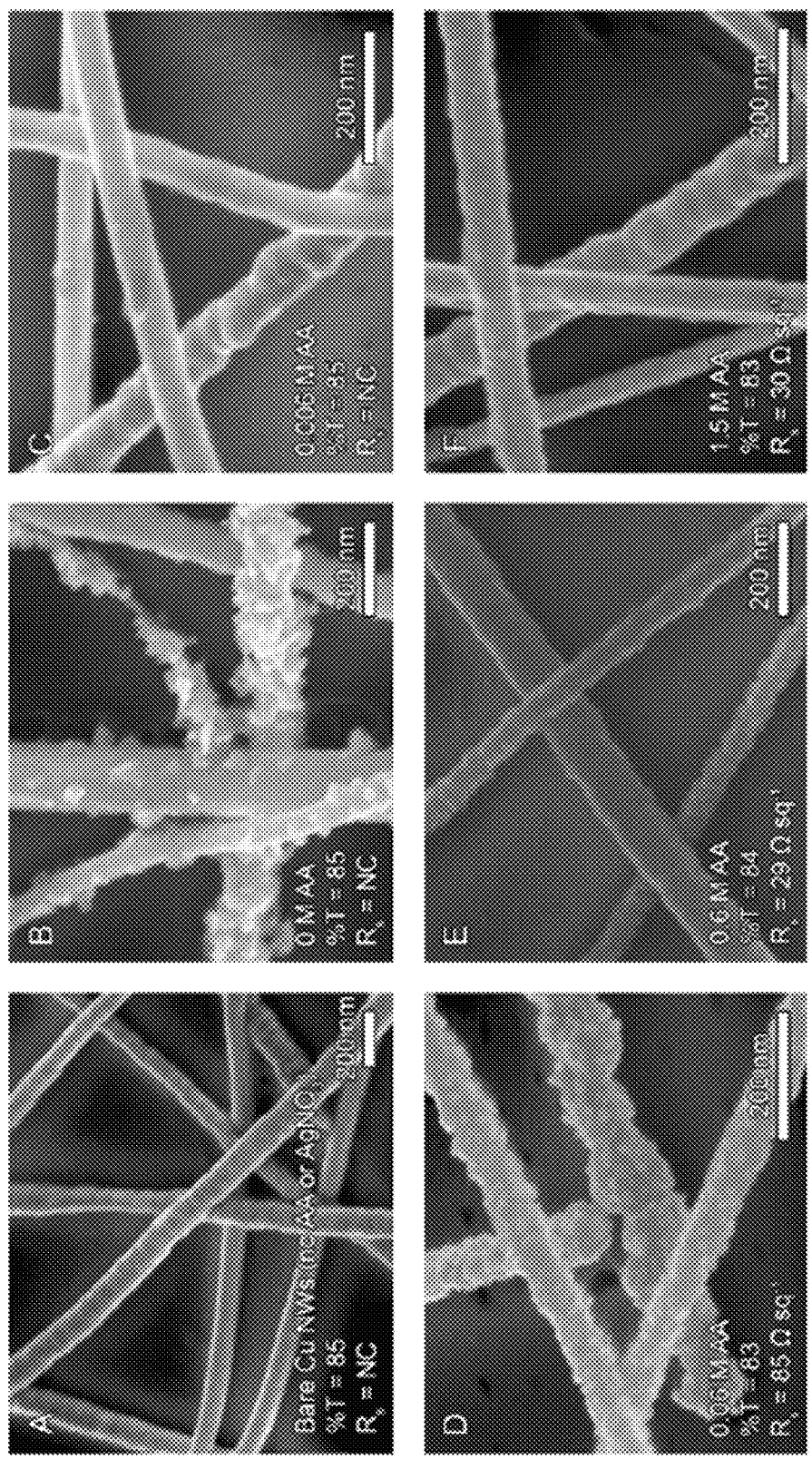
FIG. 9 are images showing copper nanowires with and without AA or AgNO$_3$ addition in accordance with embodiments of the present disclosure.

FIG. 9 are images showing copper nanowires with and without AA or $AgNO_3$ addition in accordance with embodiments of the present disclosure. Particularly, image A shows bare copper nanowires from PVP/DEHA storage solution with no AA or $AgNO_3$ addition. Nanowire films after the CuAg nanowire reaction was performed with 0 M AA (see image B), 0.006 M AA (see image C), 0.06 M AA (see image D), 0.6 M AA (see image E), and 1.5 M AA (see image F). All films were washed twice with acetone for 30 seconds and DI water for 60 seconds prior to % T and $R_s$ measurements. FIG. 9 shows SEM images exemplifying the etching that takes place when $AgNO_3$ is added to a solution of copper nanowires at AA concentration used in FIG. 3A (image A of FIG. 9 shows an SEM image of bare copper nanowires films fabricated without any $AgNO_3$ or AA for reference). At low AA concentrations (0.006 M), etching occurs (image B of FIG. 9) as there is not enough AA to protect the copper nanowires from being oxidized by silver. At a slightly higher AA concentration (0.06 M), no etching occurs due to sufficient AA sheltering the copper nanowires, but $Ag^+$ is not able to be reduced (smooth nanowires in image C of FIG. 9). But as the concentration of AA is gradually increased, there is enough AA to reduce $Ag^+$ and protect the nanowires and Ag begins to coat the copper nanowires reaching a maximum at about 0.6 M (images D and F of FIG. 9). This assertion is supported by the optoelectronic properties of transparent films fabricated from the nanowires produced in each reaction. Films are non-conductive at similar transmittances until silver begins to coat the nanowires. Additionally, these SEM images support the DFOM image in image F of FIG. 1 and the SEM image in FIG. 4B in that there are no stray silver nanoparticles reduced in solution indicating $Ag^+$ reduction occurs only on the copper nanowires. This is most likely due to the ascorbic acid covering the nanowires and directing $Ag^+$ reduction to the surface of the copper nanowires rather than in solution which in turn prevents $Ag^+$ reduction via galvanic replacement.

In FIGS. 10A and 10B, it shows that in order to quantify the amount of silver coating on the copper nanowires, AAS was performed to determine the molar ratio of copper to silver of CuAg nanowires that had been produced with different volumes of $AgNO_3$. FIG. 10A is a graph of the thickness of the resulting silver layer on the copper nanowires versus volume of $AgNO_3$ added. Silver shell thicknesses of 5, 15, and 30 nm were formed on the copper nanowires when 0.15, 0.5, and 1 mL of 0.025 M $AgNO_3$ were introduced, respectively, showing a nearly linear relationship of ~29 nm $mL^{-1}$. This result is in good agreement with the measurement from the SEM images (e.g., FIG. 2B) which indicated that a silver shell about 6.5 nm thick was formed on the copper nanowires after a 0.15 mL 0.025 M $AgNO_3$ addition. With the original copper nanowires having an average length of ~28.3 μm, aspect ratio (L/D) of 360, the final aspect ratio (L/D) of the CuAg nanowires was decreased to 320, 260, and 200 as the diameter of the nanowires increased.

A thin layer (~5 nm) of silver coated onto copper nanowires provides identical optoelectronic properties to pure silver nanowires of similar L/D and copper nanowires of higher L/D due to the decrease in contact resistance between individual nanowires (Ag—Ag versus Cu—Cu). FIG. 10B shows plots of transmittance versus sheet resistance for CuAg nanowires with various aspect ratios (where the D portion includes silver shell thicknesses). For comparison, the properties of bare copper nanowires with L=28.3 μm and D=79 nm (L/D=360) are shown as well as pure silver NWs with similar dimensions (L=25 μm, D=85 nm, L/D=300). The bare copper nanowires, pure silver nanowires, and CuAg nanowires with L/D=320 (~5 nm thick silver shell) all exhibit comparable performance which is interesting as one would expect the optoelectronic properties of the nanowires to decrease as their diameters increased due to a lower transmittance. However since the CuAg nanowires are completely coated with a layer of silver in solution, once films of these CuAg nanowires are fabricated the overall network sheet resistance is comparable to films of pure silver nanowires because the contacts between the nanowires are Ag—Ag instead of Cu—Cu. Since the contact resistance between individual nanowires dictates the sheet resistance of the film, the higher conductivity silver allows copper nanowires with an initially lower aspect ratio to exhibit similar optoelectronic performance to pure silver nanowires. Similarly, the CuAu and CuPt nanowire films exhibit lower sheet resistance values (see FIGS. 5B and 6A) than bare copper nanowires due to the relative lower bulk conductivity of gold ($\rho=2.21\times10^{-8}$ Ωm) and platinum ($\rho=10.5\Omega\times10^{-8}$ m). As the amount of silver added to the nanowires is increased, the performance of the resulting CuAg nanowire networks steadily decreases with the thickness of the nanowires. This is again due to the increased diameter of the nanowires where a similar decrease in performance is expected for thicker silver nanowires. Thus, films of copper nanowires can be coated with a thin layer of silver, deposited from solution, and immediately conductive with properties matching those of pure silver nanowires.

Next, oxidation resistance of As-printed copper-silver nanowires was targeted. To explore the oxidation stability of CuAg nanowires, representative films of various aspect ratios were compared to films of bare copper nanowires and pure silver nanowires in dry and humid environments. Upon exposure in a dry oven at 160° C., as shown in FIG. 11B, the bare copper nanowires quickly became insulating due to thermal oxidation, indicated by a $R_s$ increase from 39 $\Omega sq^{-1}$ to 80 $\Omega sq^{-1}$ in only 30 minutes, whereas all CuAg nanowire samples of L/D=320, 260, and 200 remained conductive with the sheet resistances only increasing slightly over 24 hours from 26 to 49 $\Omega sq^{-1}$, 25 to 33 $\Omega2 sq^{-1}$, and 31 to 42 $\Omega sq^{-1}$, respectively, showing similar stability to pure silver nanowires.

Environmental stability, i.e. stability in humid atmospheres, is another metric for measuring the corrosion resistance of thin films. When subjected to an 85° C./85% RH environment, bare Cu NWs once again lose network conductivity in less than 1 hour as the sheet resistance quickly increases by orders of magnitude due to oxidation (FIG. 11B). A protective layer of silver was shown to inhibit this oxidation and conductivity loss. All of the CuAg nanowire samples, L/D=320, 260, and 200, performed markedly better than the bare copper nanowires in the humidity chamber and retained conductivity. CuAg nanowires with a 5 nm shell of silver showed an increase in sheet resistance by about 2 orders of magnitude and was not enough to protect the copper core from oxidation under these humid conditions. Indeed, when this set of CuAg nanowires were washed with acetic acid (one dip for ~5 seconds), the optoelectronic properties of the films improved dramatically compared to the thicker silver shell nanowires indicating the etching away of copper oxides on the surface and a correspondingly thin silver coverage (see FIGS. 3A-3C). This instability can be remedied by increasing the silver content on the nanowires: with a 15 nm thick silver shell, films of CuAg nanowires became markedly more stable exhibiting a $R_s$ increase to 94 $\Omega sq^{-1}$ from 50 $\Omega sq^{-1}$. As with the dry oven results, any further increase in the silver shell thickness (again in this case to 30 nm) did not improve the oxidation resistance of the nanowires in a humid environment, effectively capping the amount of silver necessary at 15 nm. This thickness is most likely the maximum needed thus a silver shell slightly thicker than 5 nm may be enough to improve humidity chamber stability. Even though the optoelectronic properties of the L/D=260 CuAg nanowires are lower than the L/D=320 CuAg nanowires, as stated previously, an equivalent decrease in performance is also expected for pure Ag nanowires when their nanowire diameter is increased. Thus if copper nanowires of smaller diameter may be coated with silver, resulting in a smaller final CuAg nanowire total diameter, the overall optoelectronic properties is equivalent to corresponding Ag nanowires of a higher aspect.

Copper nanowires can be coated with various thicknesses of noble metal shells such as Ag, Au, and Pt via a facile room-temperature solution-phase process. In this example method, ascorbic acid plays important roles—not only preventing Cu NWs from galvanic etching, but also reducing Ag (or Au, Pt etc.) ions directly on the surface of the copper nanowires, forming a corrosion-resistant shell. Unlike copper nanowires, CuAg nanowires with an optimal shell thickness of silver do not degrade the optoelectonic properties, but in fact make them conductive as printed, comparable to pure silver nanowires of a similar aspect ratio. This feature may be desirable considering copper nanowires can only become conductive when the oxides are reduced (high temperature $H_2$ annealing) or removed (an extra acid solution washing process). In addition, the oxidation stability of the CuAg nanowires toward high temperature and humid conditions is improved to the same degree as silver nanowires. The CuAg nanowires are stable at 160° C. and 85° C./85% RH for 24 hours while bare copper nanowires quickly become non-conductive under these conditions. These results eliminate the two major obstacles preventing copper nanowires from being implemented as the transparent conductor in optoelectric devices such as touchscreens, flat panels, OPVs, and OLEDs. Additionally, the process was reproduced with even more inert metals than silver showcasing the potential versatility of the general synthetic method.

Any Patentsor publications mentioned in this specification are indicative of the levels of those skilled in the art to which the present subject matter pertains. These patents and publications are herein incorporated by reference to the same extent as if each individual publication was specifically and individually indicated to be incorporated by reference.

One skilled in the art will readily appreciate that the present subject matter is well adapted to carry out the objects and obtain the ends and advantages mentioned, as well as those inherent therein. The present examples along with the methods described herein are presently representative of various embodiments, are exemplary, and are not intended as limitations on the scope of the present subject matter. Changes therein and other uses will occur to those skilled in the art which are encompassed within the spirit of the present subject matter as defined by the scope of the claims.

What is claimed is:

1. A method comprising:
   providing a copper nanowire comprising a base metal; and
   exposing the copper nanowire, to a solution containing ascorbic acid of at least 0.6 molars and a noble metal salt such that oxidation of copper of the copper nanowire is prevented and the noble metal ions in solution are chemically reduced onto and conformally cover the copper nanowire,
   wherein the copper nanowire and the noble metal covering the copper nanowire are non-porous.

2. The method of claim 1, wherein the noble metal is one of ruthenium, rhodium, palladium, silver, iridium, platinum, gold, and combinations thereof.

3. The method of claim 1, wherein the copper nanowire has a length between about 1 micron and about 500 microns.

4. The method of claim 1, wherein the copper nanowire has a diameter between about 3 nm and about 900 nm.

* * * * *